Feb. 21, 1939.  C. C. BENNETT  2,148,229
BRAKE TESTER AND WEIGHING MEANS
Filed Dec. 30, 1936  2 Sheets-Sheet 1

Inventor
Claude C. Bennett
By Charles L. Reynolds
Attorney

Feb. 21, 1939.    C. C. BENNETT    2,148,229
BRAKE TESTER AND WEIGHING MEANS
Filed Dec. 30, 1936    2 Sheets-Sheet 2
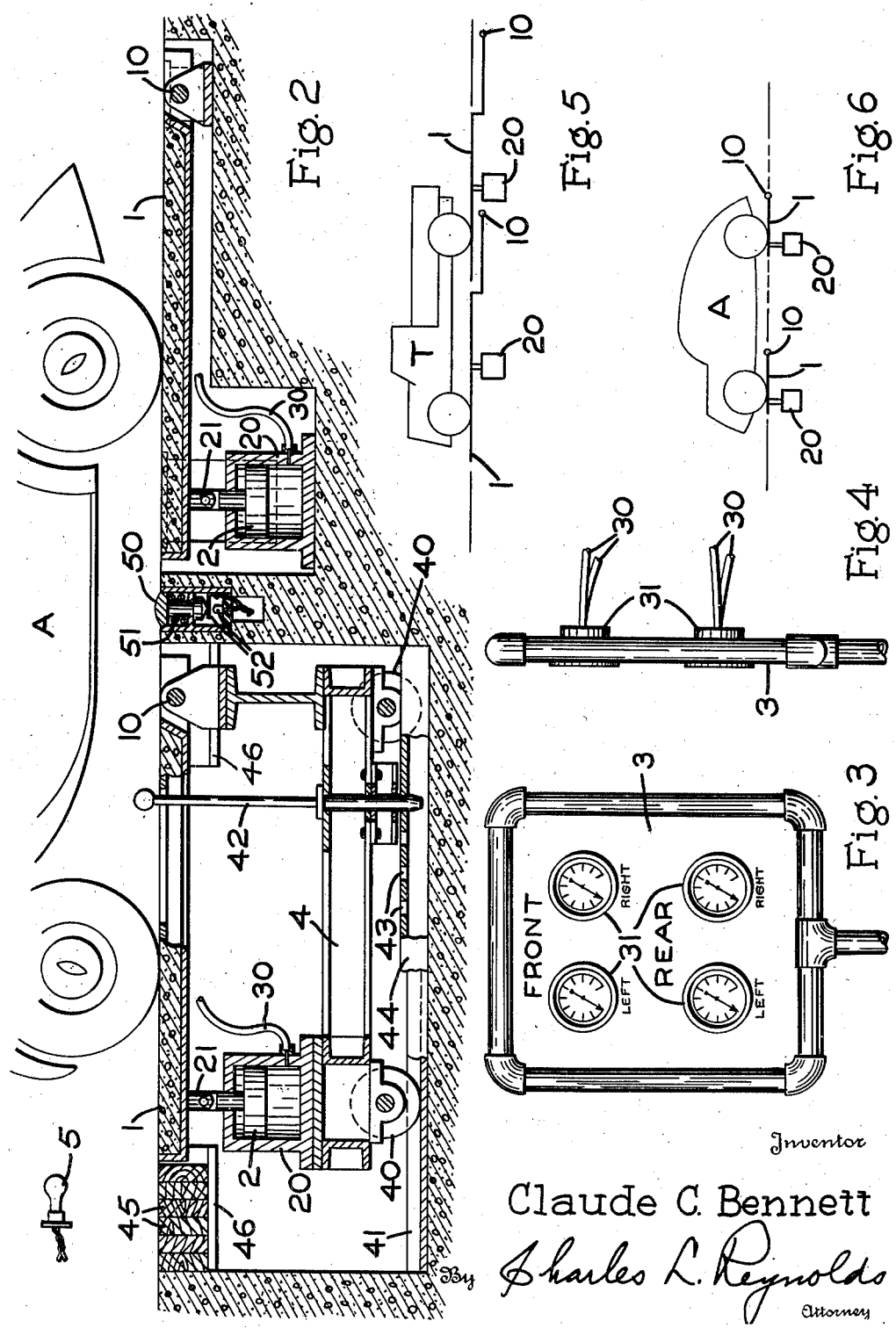
Inventor
Claude C. Bennett
By Charles L. Reynolds
Attorney Patented Feb. 21, 1939

2,148,229

UNITED STATES PATENT OFFICE 2,148,229

BRAKE TESTER AND WEIGHING MEANS

Claude C. Bennett, South Bend, Ind., assignor to A. E. Feragen, Inc., Seattle, Wash., a corporation of Washington Application December 30, 1936, Serial No. 118,186

12 Claims. (Cl. 265—47)

My invention relates to a machine for testing the brakes of an automobile, and more especially to such a machine which will test the brakes as they are applied while the automobile is moving forward, or as it is brought to a stop.

Machines which are designed to test only the friction between a brake band and a brake drum while the automobile remains stationary do not take into consideration the momentum of the automobile and the tendency for it to nose over when the brakes are applied, which occurs under service conditions. The brakes are subjected to the severest treatment, and must be most trustworthy, under conditions in which the automobile is brought to a complete and instantaneous stop, such as when the car must stop abruptly at a street intersection, upon approaching a railway crossing, or in coming to a stop before striking a person or an object in the path of the automobile. If the brakes operate equally and effectively to stop the car without swerving under such extreme conditions it may reasonably be expected that the brakes are properly equalized to operate effectively and equally under normal conditions of use.

It has heretofore been the practice to test the brakes of an automobile under such critical conditions by throwing the brakes on quickly while traveling along the road, skidding the wheels until the automobile stops, and then climbing out of the automobile to inspect the skid marks and compare the relative lengths thereof. Such a comparison was not always accurate because a smooth-faced tire would start to skid before one having sharp tread, although the skidding tire would be subjected to less drum friction and would have a slighter retarding force upon the movement of the automobile because of the lack of traction. Skidding the wheels, however, has heretofore been thought generally to be the most accurate way of indicating the relative retarding forces exerted by the several wheels.

It is the principal object of my invention, therefore, to produce a machine which will indicate accurately the comparative condition of balance between the braking effect of the several automobile wheels and in particular to indicate the relative equalization between the sets of brakes on the two sides of the automobile, so that the brakes may be adjusted to eliminate any tendency of the automobile to swerve when the brakes are applied.

It is a further object to provide such a device which will indicate the relative effectiveness of the brakes, although the wheels are not made to skid, and in fact, although the automobile may continue on its course past the brake-testing machine.

Another object of my invention is to provide such a brake testing machine having a minimum of moving parts, and providing that such parts as are capable of movement shall move through a minimum distance or shall be held from all movement, so that the accuracy of the machine will not be impaired by internal frictional forces set up between the parts thereof.

Still a further object is to provide a device which can be used substantially continuously without the necessity for resetting, after every test, the wheel engaging parts of the machine. Thus my brake tester is well adapted to the testing of the brakes of automobiles following each other in a continuous line, so that as soon as one automobile has passed over the machine, a second may proceed immediately on to the machine without having to wait for the operator to relocate the wheel engaging member or associated parts.

It is also an object to construct a brake testing machine having these advantages, but which, nevertheless, will be of simple and compact construction, and which will have few operating parts, so that it will require the minimum of upkeep, parts replacement, attention and expense, although it may be in use almost continuously.

It is also an object to provide such a brake tester which is readily adjustable, and which will indicate accurately the condition of the brakes on automobiles of varying wheel base.

My invention, then, relates to a brake tester having the aforementioned characteristics and which comprises the combination of parts described hereafter, the particular novel features of which are defined in the appended claims.

In the drawings I have shown a representative construction of my device for the purpose of illustrating the principle of its operation. The mechanical details and the type and arrangement of the several parts may be varied considerably within the spirit of my invention to obtain the same or equivalent results.

Figure 2 is a longitudinal section taken along the line 2—2 of Figure 1, showing an automobile in a typical brake testing position.

Figure 3 is a front elevation and Figure 4 is a side elevation of the indicating mechanism.

Figures 5 and 6 are diagrammatic illustrations of two different modified forms which my device may take.

Figure 1:
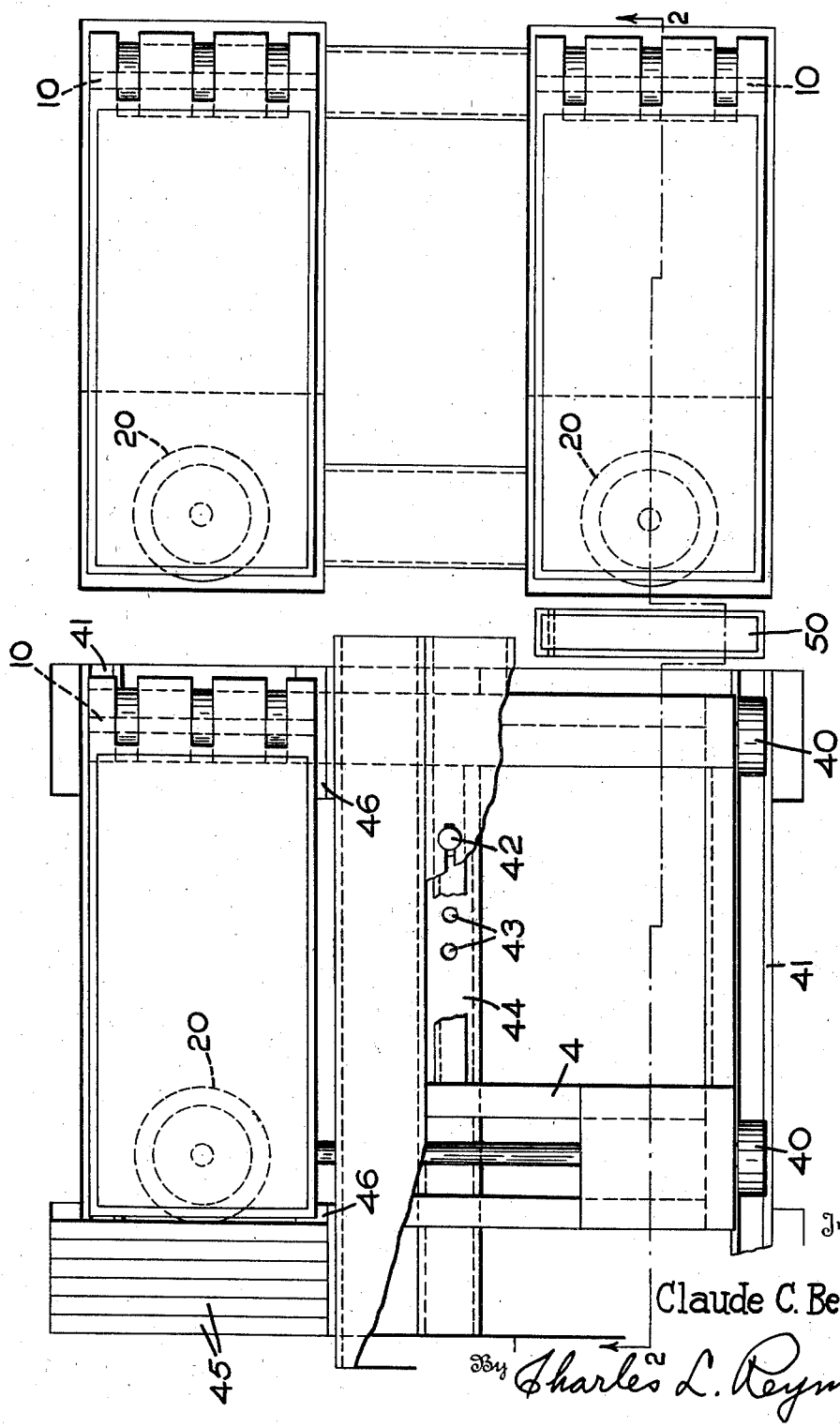
Figure 1 is a plan view of my brake tester showing parts broken away to disclose part of the interior mechanism.

When the brakes of an automobile are applied, a retarding force is created which is balanced by the generation of an inertia force acting in the direction of movement of the automobile, which may be considered as concentrated in a plane at the height of the automobile's center of gravity. This inertia force produces a moment tending to nose the automobile over. A counter-moment of equal value is set up by a change in pressure of the supporting surface, upward against the wheels, pressure of the front wheels being increased and that of the rear wheels being decreased.

As stated, the inertia force is always equal to the braking force, and since the braking force is divided among the four wheels of the automobile, we may similarly divide the inertia force into four components, each of which we may assume to act at the height of the car's center of gravity, in the direction of the car's movement, and at a point over the point of road contact of its respective wheel. Each of these inertia components, then tends to nose over the automobile. At each wheel there will be set up a pressure as the result of the creation of these inertia components, the tendency of these several pressure components being to increase the mutual pressure of the front wheels upon the supporting surface and to decrease the mutual pressure of the automobile's two rear wheels upon the supporting surface. It is this change of wheel pressure caused by the creation of the inertia force, which in turn occurs because of the braking force created and is proportional thereto, that my brake testing machine indicates. The amount of increase in front wheel pressure and the amount of decrease in rear wheel pressure varies, of course, directly with the inertia force, and therefore directly with the amount of braking force created. The greater the retarding force, exerted by a front wheel, the greater will be the pressure of that wheel. On the other hand, the greater the retarding force exerted by a rear wheel the smaller will be the pressure exerted by that wheel, because of the tendency of this retarding force to cause the automobile to nose over and to lift the rear wheels.

It will be seen, therefore, that a direct comparison of the braking force of the front wheels may be obtained by comparing the relative increases in wheel pressures produced when these brakes are applied. Similarly the braking effects of the rear wheels may be compared directly as to braking efficiency by comparing the relative decreases which occur when these brakes are applied. A comparison between the braking effect of the front and rear wheels on each side of the car may be made by comparing the increase or decrease of pressure of each wheel from the static pressure or weight carried by such wheel, with the automobile at rest, or by comparing the increase in pressure of the front wheel with the decrease in pressure of the rear wheel, the pressure differential, of course, being transmitted to the wheels on the other side of the car, unless the braking effect of front and rear wheels are equal.

For the different operations of the device outlined, four platforms receive the wheels of the automobile, one running upon each platform. One set of platforms should be adjustable lengthwise, to accommodate automobiles of different length of wheel base. Some sort of mechanism is then provided for registering the pressure of the several wheels on each of these platforms. Since the weight of the car remains constant and the pressure distribution among the four wheels of the car weight is also known, or can be ascertained by permitting the four wheels to rest on their respective platforms, the difference in the values registered from these known values indicates the pressures, either positive or negative, generated by the application of the brakes. The pressure differences will, of course, be positive on the front wheels and negative on the rear wheels, indicating the tendency of the automobile to nose over when the brakes are applied.

In the particular form illustrated, I provide platforms 1 which are pivoted at one end 10, preferably the rear or run-on end, so that no horizontal movement of the platform is possible in testing. They will not be dragged in the direction of movement of the car when the brakes are applied, nor will they be moved sidewise if the car tends to swerve. To support the swingable end of these platforms pistons 2, moving in cylinders 20 and connected to the platforms by connecting rods 21, may be utilized. These cylinders are filled with oil or similar liquid under an initial pressure at least sufficient to support the pistons, connecting rods, and swingable platform ends. The initial pressure may be sufficient to support, also, a part of the weight of the car borne by its particular wheel.

From each of these cylinders 20 extends an oil filled conduit 30, which is connected to the appropriate gauge 31 mounted on an instrument panel 3. The gauges 31 are designed to register increases in oil pressure over the initial pressure, and may conveniently be of the Bourdon tube type with a dial and pointer indicating mechanism. Oil and similar liquids are, of course, non-compressible, and hence pressure exerted on platforms 1 is transmitted directly through the pistons 2 to the oil which actuates the pressure gauges. Because of the relatively large volume of the cylinder 20 and area of the piston 2 as compared with the volume of the Bourdon tube of the gauge, the pointer may be moved over its complete range without perceptible movement of the platforms 1. Furthermore, appreciable movement of these platforms would interfere with the continued movement of the automobile wheels beyond the free ends of the platforms, especially if the wheels were locked and sliding. For all practical purposes, therefore, the piston and cylinder arrangement is equivalent to and serves as a rigid supporting means, rendering the platform immovable vertically even under operation of the device, although they are pressure sensitive.

When an automobile A or a truck T is in place upon the device, the pressure exerted by the pistons 2 upon the oil in the cylinders 20 will vary, of course, as the automobile moves along the pivoted platforms 1, since the pressure point is changing progressively. This does not alter the convenience of operation of the device, however, if a comparative reading only is to be taken, for the gauges registering the pressures on the front wheels may be compared directly, and similarly the readings for the two rear platforms may be compared directly. Also, simultaneous readings of the front and rear gauges for one side of the car may be taken by simply subtracting from each reading the normal weight distribution of the car. A comparison between the positive and the negative pressure readings on the front and rear wheels, respectively, will thus be obtained.

However, by mounting one such platform and its cylinder upon a carriage 4 which is movable lengthwise of the platform, the pivots 10 for the front and rear platforms may be spaced to be equal to the wheel base of the automobile to be tested. Thus, the carriage 4, mounted upon rollers 40 in flanged tracks 41, support the cylinder 20 and the pivot 10 for the right and left front platforms, for example. The carriage is held in any adjusted position by a locking pin 42 received in a hole in the frame of the carriage, and engageable in any one of longitudinally spaced holes 43 in a fixed bar 44. The gap between the edge of the approach or run-off floor may be suitably bridged, as by blocks 45, supported on flanges 46. The entire mechanism is located in a pit below the floor and platform level.

If the critical situation of bringing the automobile to a complete stop is to be tested, the automobile may be stopped on the platform. Maximum indicators, of any suitable type known in the art, such as a pin moving in a circumferential slot on each dial to be pushed around by the pointer, may be employed to register the surge occurring when the brakes are clamped on. As the car comes to rest, the arrows will drop back and will then register the actual weight distribution of the car. By subtracting this weight distribution from the pressure indicated by the maximum indicators for the front wheels an absolute reading of braking effect may be obtained in pounds of braking force, by simple calculation or by properly graduating the dial. With the rear wheel gauges the static distributive load of the wheels would be greater than the pressure indication when the brakes are applied, so for these gauges some other type of indicating means might be employed to indicate the braking surge, or the operator could note the reading of these two dials when the brakes are applied. A comparison of the readings of all four indicators may then be made to ascertain the relative braking condition of the four brakes. The brake tester may also be used to test the brakes under braking conditions before the car has come to a stop. In an operation of this type, the car may be traveling at any desired speed and the brakes applied before the car reaches the platforms 1. Instead of stopping on the platforms, the car will continue across them. With the pivoted platforms shown, the readings will increase progressively as the car proceeds from the pivoted end to the opposite end and the maximum indicator would show the reading just as the car passed off the platform, or a visual comparison of the readings might be made as the car progresses. Such a test would indicate almost at a glance whether or not there were any appreciable inequality between the two front wheels and the two rear wheels, thus showing the tendency of the car to swerve sidewise. For such a test, even two platforms might be employed which would first be crossed by the front wheels and thereafter be crossed by the rear wheels, the successive readings being noted, or the platform might be of a length to accommodate both front and rear wheels at each side, although with the arrangements of these two last mentioned types, the front and rear wheel brakes on the two sides could not be compared with respect to each other.

A further arrangement might consist in either two or four platforms of short length centrally supported, rather than being pivoted, but still being provided with means to prevent all horizontal movement. As the wheels travel over such platforms upon continued movement of the car, a direct indication of pressure results, rather than a moment about a pivot point. Furthermore, the reading would not vary as the car progresses along such platforms as it does where pivoted platforms are used.

If the car is to be brought to a stop on the platforms so that an absolute reading may be obtained without knowing the weight of the car, the platforms 1 should have their pivots spaced exactly equal to the wheel base of the car as shown in Figures 2 or 6. Since the wheel base length varies from car to car, if it is not desired to adjust the spacing of the pivots 10 for the platforms accommodating the front and rear wheels, as already described, the modification shown in Figure 5 may be employed. In that arrangement the pivots are spaced apart the distance of an average wheel base. The difference between the pivot point and the normal stopping point on the platform is made relatively long. Thus the lever arm between the point of wheel contact and the pivot will be approximately the same although the pivot spacing might be slightly different from the wheel base length, the difference being too slight to cause any appreciable variation in the reading.

With such a device the reading when the car or truck has come to rest may be subtracted directly from the brake surge readings to obtain the absolute brake readings, keeping in mind that the resultant quantities will be positive for the front wheels and negative in the case of the rear wheels.

To secure reasonable uniformity of readings it is desirable to cause the brakes to be applied when the automobile wheels are about to roll upon their respective platforms, or are at some given spacing therefrom or thereon. To this end I may employ an automatic signal to indicate to the driver when to apply the brakes, such as the lamp 5 which is flashed on by the front wheels when they reach the proper distance from the pivot of the front platforms. A transverse bar 50, held by a spring 51 slightly above the floor level, in advance of the front platforms, will be depressed as the front wheels pass thereover, closing a switch 52 in circuit with the lamp 5, illuminating the latter.

There is one other advantage gained by the employment of my brake tester which should be mentioned. Whereas ordinarily the brakes should be either applied prior to the time the car reaches the platform and continued as the car moves thereover, or else the brakes should be applied after the car reaches the platform and the car is stopped thereon, in the employment of my mechanism the maximum braking reading will be obtained for the condition of the test whether the brakes are applied for a long period or a short period, and whether the brakes, when the car is to run beyond the platform, are applied before the car has reached the platform or after it is upon the platform. Similarly when the car is to be stopped on the platform, an accurate reading may be obtained although the brakes may be somewhat applied initially before the car reaches the platform, since in such case only the critical braking force will be indicated, namely, that at or immediately prior to the stoppage of the car, which is the time when the brakes will be most strongly applied.

Attention is directed to the fact that this device may be employed to ascertain the proper ratio between the braking effort exerted by the front and rear wheels in different vehicles, wherein the height of the center of gravity above the vehicle supporting surface varies, to obtain the maximum deceleration of the vehicle upon the application of the brakes. For example, this device may be employed to determine whether greater vehicle deceleration will be obtained by applying the brakes equally to the front and rear wheels, or whether the greatest deceleration is obtained by applying a greater braking effort to either the front or the rear wheels.

While the invention has been described with particular reference to a few desirable embodiments thereof, it is to be understood that the disclosure is illustrative only, and that many changes may be made in the particular arrangements of parts to accomplish the desired results comprehended within the scope of this invention without departing from the spirit of the invention as defined by the following claims.

What I claim as my invention is:

1. An automobile brake tester comprising two platforms disposed to be run upon by the opposite wheels the brakes whereof are to be tested, means supporting each platform for vertical movement but prohibiting horizontal movement, means restraining appreciable vertical movement of the platform, and means cooperating with each platform to indicate the pressure upon the platform generated by braking the wheel.

2. An automobile brake tester comprising a platform disposed to be run upon by a front wheel, and a second platform disposed to be run upon simultaneously by a rear wheel, means supporting each platform for vertical movement but prohibiting horizontal movement, means restraining appreciable vertical movement of the platforms, and means cooperating with each such platform to indicate the pressure thereon generated by braking the corresponding wheel.

3. An automobile brake tester comprising four platforms, each disposed to receive a wheel, and to be run upon simultaneously by all the wheels of the automobile, means restraining horizontal movement of the platforms, and means cooperating with each platform to indicate the vertical force between the wheels and the respective platforms, generated by braking the several wheels, for comparison of the braking effect on the wheels.

4. An automobile brake tester comprising four platforms disposed to be run upon by the respective wheels, the brakes whereof are to be tested, means supporting each platform for vertical movement but prohibiting horizontal movement, means restraining appreciable vertical movement of each platform, and means cooperating with each such platform to indicate the pressure thereon generated by braking the corresponding wheel.

5. An automobile brake tester comprising a platform to be run upon by a wheel, the brake whereof is to be tested, a fixed hinge supporting one end of said platform and disposed in a horizontal plane, means supporting and restraining appreciable vertical movement of the other end of said platform, and means cooperating with said supporting means to indicate the pressure on said platform generated by braking the wheel.

6. An automobile brake tester comprising a platform disposed to be run upon by a wheel the brake whereof is to be tested, a fixed hinge support for said platform disposed adjacent the run-on end thereof, and substantially in the plane thereof, and means restraining from appreciable vertical movement and cooperating with the swinging end of the platform to indicate the pressure thereon generated by braking the wheel.

7. An automobile brake tester comprising two platforms disposed one behind the other to be run upon simultaneously by the front and rear wheels on one side of the automobile, two fixed hinges spaced apart substantially the length of the automobile's wheel base, and each supporting a corresponding end of said platforms, independent means supporting and restraining from appreciable vertical movement the other ends of said platforms, and means cooperating with said supporting means to indicate the relative pressures on said platforms generated by braking the wheels.

8. An automobile brake tester comprising two platforms placed side by side to be run upon simultaneously by two corresponding wheels, one on each side of the automobile, two fixed hinges disposed in a line and spaced apart approximately the width of an automobile, and each hinge supporting a corresponding end of said platforms, independent means supporting and restraining from appreciable vertical movement the other ends of said platforms, and means cooperating with said supporting means to indicate the relative pressures on said platforms generated by braking the wheels.

9. An automobile brake tester comprising a platform to be run upon by a wheel, a fixed hinge extending normal to the plane of the wheel and supporting one end of said platform, a supporting piston connected to and restraining appreciable vertical movement of said platform, connected thereto at a point remote from said hinge, a fluid-filled cylinder receiving said piston, and fluid pressure indicating means communicating with said cylinder to indicate the pressure created in said fluid by the pressure on said platform generated by braking the wheel.

10. An automobile brake tester comprising a platform disposed to be run upon by a front wheel, and a second platform disposed to be run upon simultaneously by a rear wheel, means supporting each platform for vertical movement but prohibiting horizontal movement, means restraining appreciable vertical movement of the platforms, means cooperating with each such platform to indicate the pressure thereon generated by braking the corresponding wheel, and means to adjust the spacing of said platforms lengthwise.

11. An automobile brake tester comprising four platforms, each disposed to receive a wheel, and to be run upon simultaneously by all the wheels of the automobile, means restraining horizontal movement of the platforms, means cooperating with each platform to indicate the vertical force between the wheels and the respective platforms, generated by braking the several wheels, for comparison of the braking effect on the wheels, and means to adjust the front wheel platforms jointly and lengthwise with respect to the rear wheel platforms.

12. An automobile brake tester comprising two platforms disposed one behind the other to be run upon simultaneously by the front and rear wheels on one side of the automobile, two fixed hinges spaced apart substantially the length of the automobile's wheel base, and each supporting a corresponding end of said platforms, independent means supporting and restraining from appreciable vertical movement the other ends of said platforms, means cooperating with said supporting means to indicate the relative pressures on said platforms generated by braking the wheels, a carriage supporting one such platform, its hinge and its supporting and restraining means, means guiding said carriage for lengthwise movement relative to the other platform, to vary the spacing between the two hinges, and means to secure the carriage in a plurality of adjusted positions.

CLAUDE C. BENNETT.